(12) United States Patent  (10) Patent No.: US 7,755,677 B2
Kaplinsky  (45) Date of Patent: Jul. 13, 2010

(54) METHOD AND APPARATUS FOR AUTOMATIC GAIN AND EXPOSURE CONTROL FOR MAINTAINING TARGET IMAGE BRIGHTNESS IN VIDEO IMAGER SYSTEMS

(75) Inventor: Michael Kaplinsky, South Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 819 days.

(21) Appl. No.: 11/482,031

(22) Filed: Jul. 7, 2006

(65) Prior Publication Data

US 2006/0268136 A1  Nov. 30, 2006

(51) Int. Cl.
  *H04N 9/68* (2006.01)
(52) U.S. Cl. ..................................................... 348/234
(58) Field of Classification Search .............. 348/234.1, 348/234, 362, 364, 229.1
  See application file for complete search history.

(56) References Cited

U.S. PATENT DOCUMENTS

| | | | |
|---|---|---|---|
| 5,745,808 A | 4/1998 | Tintera | |
| 5,841,471 A | 11/1998 | Endsley et al. | |
| 5,880,782 A | 3/1999 | Koyanagi et al. | |
| 6,271,884 B1 | 8/2001 | Chung et al. | |
| 6,486,915 B2 | 11/2002 | Bell et al. | |
| 6,546,116 B2 | 4/2003 | Brunk et al. | |
| 6,650,364 B1 | 11/2003 | Itani et al. | |
| 6,750,906 B1 | 6/2004 | Itani et al. | |
| 6,765,619 B1 | 7/2004 | Deng et al. | |
| 6,836,288 B1 * | 12/2004 | Lewis | 348/229.1 |
| 6,882,361 B1 | 4/2005 | Gaylord | |
| 6,914,630 B2 * | 7/2005 | Nakamura | 348/296 |
| 7,053,954 B1 * | 5/2006 | Canini | 348/362 |
| 2001/0035908 A1 * | 11/2001 | Kim | 348/221 |
| 2003/0098914 A1 * | 5/2003 | Easwar | 348/229.1 |

FOREIGN PATENT DOCUMENTS

JP  08214208  8/1996

* cited by examiner

*Primary Examiner*—Jason Chan
*Assistant Examiner*—Joel Fosselman
(74) *Attorney, Agent, or Firm*—Dickstein Shapiro LLP

(57) ABSTRACT

In an image processing system, the imager gain and the exposure time are adjusted based on a predefined stepping sequence using a stepping table designed to maximize the signal-to-noise ratio in the image. This is achieved by providing a stepping sequence with each step having the largest suitable integration time (exposure) and an appropriate amplifier and digital gain setting, while achieving an equal relative percentage change in image brightness between adjacent sequence steps. The size of the executed AE steps is proportional to the distance between a current image luminance and the target luminance. This is achieved by the capability to skip one or more steps in the stepping sequence, if appropriate, for each relevant executed step, with the number of skipped steps, if any, being proportional to the magnitude of the deviation from the target brightness.

18 Claims, 7 Drawing Sheets

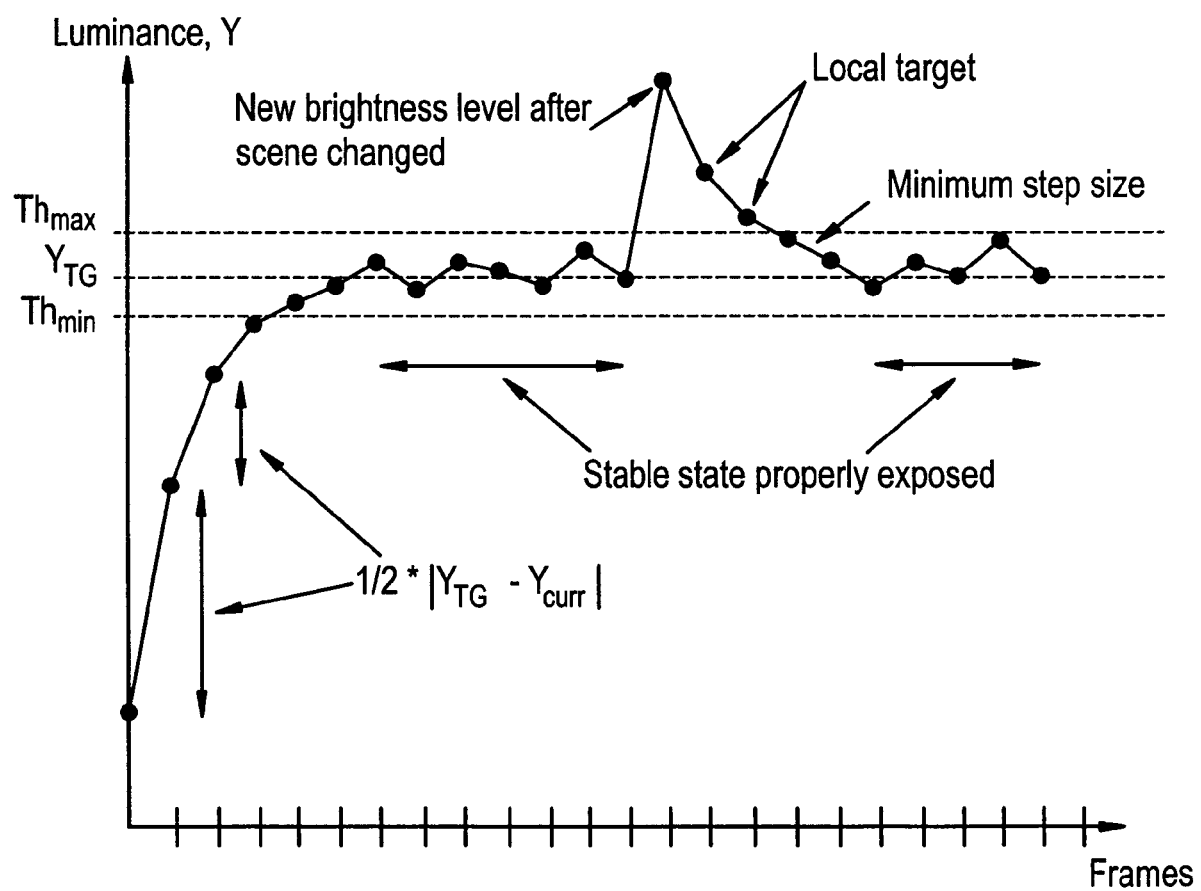

FIG. 3A

| Max Gain: | $G_{MIN}$ | $G1_{MAX}$ | $G2_{MAX}$ | $G3_{MAX}$ | $G4_{MAX}$ | ... | $GN_{MAX}$ |
|---|---|---|---|---|---|---|---|
| IT: | <ITI | ITI | ITI*2 | ITI*3 | ITI*4 | ... | ITI*N |
| Index: | 0 | 1 | 2 | 3 | 4 | ... | N |

FIG. 3B

| Max Gain: | 1.0 | 2.0 | 1.5 | 1.25 | 1.25 | ... | 1.0 | 8.0 |
|---|---|---|---|---|---|---|---|---|
| IT: | <8.33 | 8.33 | 16.66 | 25.0 | 33.33 | ... | 91.66 | 100.0 |
| Index: | 0 | 1 | 2 | 3 | 4 | ... | 11 | 12 |

METHOD AND APPARATUS FOR AUTOMATIC GAIN AND EXPOSURE CONTROL FOR MAINTAINING TARGET IMAGE BRIGHTNESS IN VIDEO IMAGER SYSTEMS

FIELD OF THE INVENTION

The present invention relates to a method and apparatus for performing automatic gain and exposure control in a video imager system so as to efficiently reach and maintain a target brightness level while also minimizing any increase in signal noise in the image.

BACKGROUND OF THE INVENTION

To achieve good image quality for both dark and bright scenes, image processing systems implement a variety of brightness adjustment procedures, commonly referred to as auto-exposure (AE). In typical image processing systems a number of factors can be controlled to affect the brightness (luminance) of the image. The most frequently controlled factors comprise variable optical integration time, variable gain settings of the amplifiers and variable reference voltages of the analog-to-digital converters in the system. In some systems, programmable digital gains are also available.

Many current systems provide for fast convergence to a desired or target brightness, but also greatly increase signal noise in the image, which results in poor image quality.

Given the number of controllable factors and their associated discrete increments of adjustment, there is a need for a method that would not only converge to the preset luminance level of the image, but would also optimize signal-to-noise ratio, provide an efficient speed of adjustment and be stable enough not to create frequent brightness adjustments in response to small or short changes in the scene illumination. Another important goal of an efficient AE method is that it should avoid "flicker" resulting from the oscillating light intensity of fluorescent illumination.

BRIEF SUMMARY OF THE INVENTION

The present invention addresses the needs of the prior art by providing a method for efficiently maintaining a target image brightness while maximizing the signal to noise ratio of the image, and an apparatus implementing the method which is simple, robust, and effective to achieve the desired AE control.

In particular, the present invention adjusts the gain and the exposure time based on a predefined stepping sequence using a stepping table designed to maximize the signal-to-noise ratio in the image. This is achieved by providing a stepping sequence with each step having the largest suitable integration time (exposure) and the appropriate amplifier and digital gain setting, wherein the stepping sequence provides an equal relative percentage change in image brightness between adjacent sequence steps.

The method of the present invention advantageously enables simple hardware implementation for the performance of a variable speed AE sequence. In the apparatus aspect of the invention, a current luminance value and time buffered luminance value are calculated in an AE measuring engine and passes the values to an AE logic unit, which uses the time buffered luminance value to determine whether or not an adjustment is necessary. If an adjustment is necessary, the logic unit executes one or more adjustments to the integration (exposure) time and/or imager gain in accordance with the appropriate step in the stepping sequence. The size of the adjustments according to the executed AE steps is proportional to the distance between the current image luminance level and the target luminance level. This is achieved by the capability to skip one or more steps, if appropriate, in the stepping sequence for each relevant executed step, with the number of skipped steps, if any, being proportional to the magnitude of the deviation from the target brightness.

Other features and advantages of the present invention will become apparent from the following description of the invention with reference to the accompanying drawings.

BRIEF DESCRIPTION OF THE DRAWINGS

FIG. 2 is a time chart illustrating how the auto-exposure is controlled according to the present invention to efficiently reach and be maintained within a stability interval of the target luminance value;

FIG. 3A is a table showing the generalized values for the integration time and the maximum gain setting for each zone in the stepping sequence;

FIG. 3B is a table showing a specific example of integration times and maximum gain settings for each zone in the stepping sequence;

DETAILED DESCRIPTION OF THE INVENTION

In the present invention, auto-exposure is controlled by adjusting both the integration time (exposure) of an image in an image sensor and the gain of the image data in a coordinated manner so that the transition between a current luminance value and a target luminance value is smooth, even and efficient. Since increasing the gain of the image data amplifies the existing data in a received signal, any noise in the original signal is also amplified upon increasing the gain. On the other hand, increasing the integration time of an image affects the luminance value by allowing the image sensor to obtain a more data-rich signal having greater bit depth, which provides more details and tonal range such as shadows and highlights of the image itself. Thus, to increase the signal level of the image obtained by the image sensor, it is preferably to have as large an integration time as is suitable while effecting any further desired increase in signal by increasing and amplifier and digital gain. In this regard, it is noted that if the gain of an image signal is to be amplified, it is preferable to first increase the analog gain, to take full advantage of the details which may be gleaned from the existing bit depth, as opposed to increasing the digital gain, if available, which merely multiplies the present signal without regard to the bit depth.

In view of the above, the present invention provides optimal image quality by adjusting the gain of the image data and the exposure time as a pair according to a predefined stepping sequence which maximizes the signal-to-noise ratio of the image. This is achieved by creating a stepping sequence in which each step executes the largest suitable increment in integration time (exposure) and the smallest suitable increment in amplifier and digital gain setting so that adjacent steps in the stepping sequence produce equal relative (percentage) change in image brightness between adjacent sequence steps.

Figure 1:
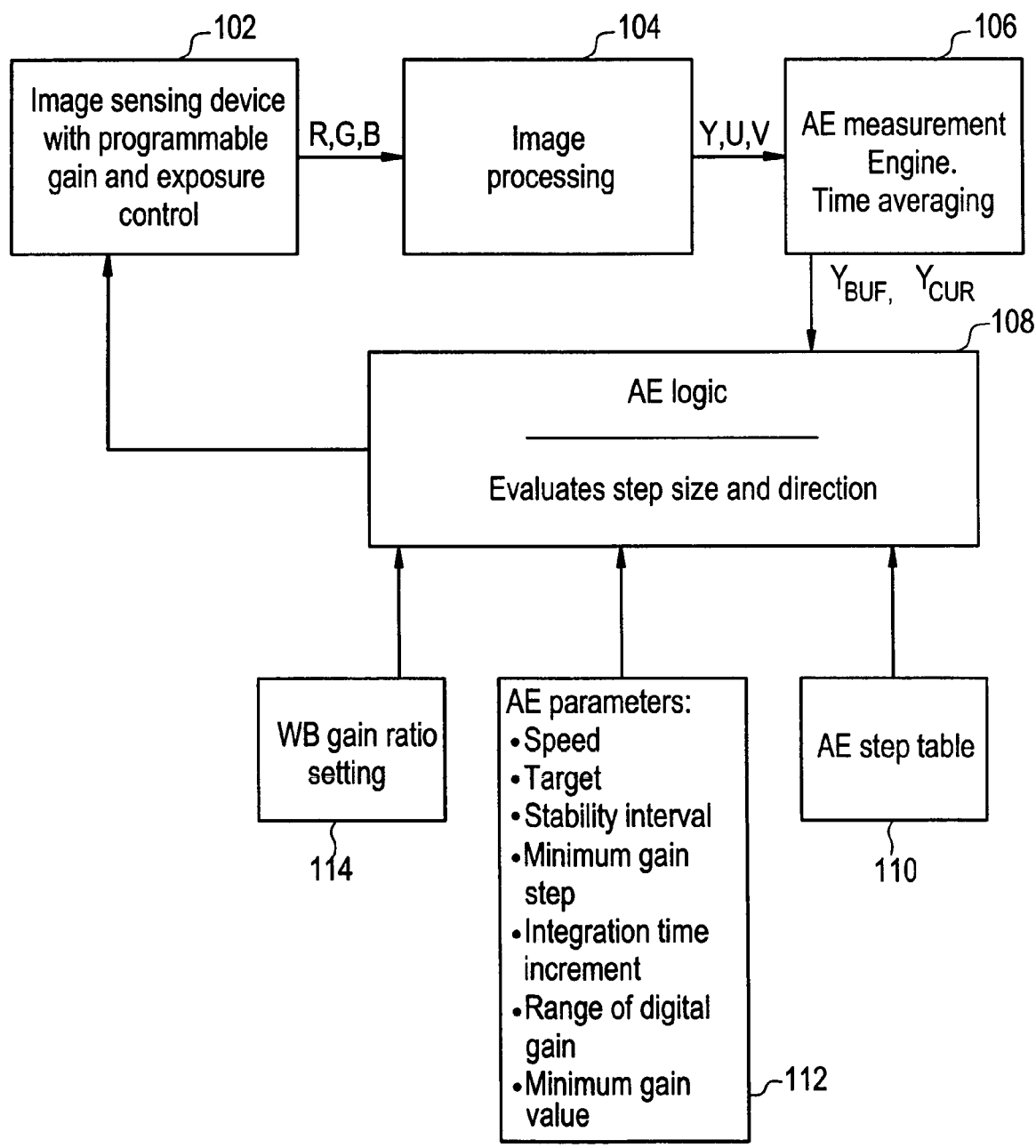
FIG. 1 illustrates a relevant portion of an imaging apparatus which implements the method of the present invention.

A description of the method aspect of the present invention will be provided in conjunction with the relevant portion of an apparatus for carrying out the method as illustrated in FIG. 1. The relevant portion of the apparatus includes an imaging sensing unit 102, an image processing unit 104, an auto-exposure (AE) measurement engine 106, and an AE logic unit 108, AE step table 110 and stored parameters 112. In addition to these elements, the AE logic unit 108 sends any brightness setting changes to be used for setting the white balance gain ratio 114 in the apparatus.

The imaging sensing unit 102 is preferably constructed as an integrated circuit which includes pixels made of a photosensitive material such as silicon. The image sensor 102 may be formed as a CMOS sensor and combined with a processor, such as a CPU, digital signal processor or microprocessor, in a single integrated circuit. Alternatively, the image sensor in the image sensing unit 102 may be constructed as a charge coupled device (CCD). Image sensing unit 102 also includes a programmable gain and integration time (exposure) control for controlling the brightness of the image obtained by the image sensor. Although the gain and integration time may be manually controlled by a user, more preferably the gain and integration time are controlled by the AE logic, as will be described more fully below, so that the imaging apparatus will automatically adjust to accommodate changes in the luminance level of the scene or to maintain a target luminance level, as appropriate.

Image processing unit 104 receives image data from the image sensor and performs various functions such as data correction for defective pixels, color interpolation, sharpness filtering, white balancing, etc. For purposes of the present invention, however, the most relevant function of image processing unit 104 is to output the luminance value Y for each pixel.

During an active frame time, AE measurement engine 106 receives the luminance value Y for each pixel as output from the image processing unit 104 and computes a current luminance value $Y_{cur}$ by spatial averaging the individual pixel luminance values in one or more subframes of the image. If more than one subframe is used, then $Y_{cur}$ is obtained as a weighted sum of the individual subframe averages. This allows the various subframes representing different regions of the image to be assigned different levels of importance for enabling modifications to the AE controls to account for back-illuminated scenes, for example, where the brightness of the center of the scene is much lower than the brightness of the background.

AE measurement engine 106 preferably also calculates a time averaged luminance value $Y_{buf}$ according to Eq. 1, to reduce the sensitivity of the AE controls to short changes in the scene illumination.

$$Y_{buf} = Y_{buf} * D + Y_{cur} * (1-D) \quad \text{(Eq. 1)}$$

wherein D=buffering factor, 0<D<1

In other words, the time averaged luminance value is updated to take into account each new current luminance value, but only by weighting the new current luminance value at less than one.

AE logic unit 108 receives as input $Y_{cur}$ and $Y_{buf}$ calculated in AE measurement engine 106, determines whether or not a brightness adjustment needs to be made, and if so, evaluates a step size and direction using a predetermined stepping sequence based on an AE step table 110, and AE parameters 112 such as the target luminance value $Y_{tg}$, the speed at which the apparatus should achieve the target luminance value, a stability interval, a minimum gain step MGS, an integration time increment ITI, a range of digital gain $DG_{min}$ to $Dg_{max}$, a minimum gain value $G_{min}$ as defined by the physical parameters of the apparatus, etc.

Using the time averaged luminance value of $Y_{buf}$ received from AE measuring engine 106, AE logic unit 108 determines a difference between the time-averaged luminance value and the target luminance value. If the difference falls within a preset range representing a stability interval as set in the stored parameters 112, then no action is taken by the AE apparatus. This provides for increased stability of the auto exposure control, which prevents the AE from being adjusted in an oscillating manner and also prevents AE setting changes in response to short bursts of change in the scene brightness. In particular, the stability interval is defined with an upper threshold $Th_{max}$ and a lower threshold $Th_{min}$ such that the difference between $Y_{buf}$ and $Y_{tg}$ is considered to be within the stability interval if Eq. 2 is true:

$$Y_{tg} - Th_{min} < Y_{buf} < Y_{tg} + Th_{max} \quad \text{(Eq. 2)}$$

If, on the other hand, the difference is outside the stability interval, then the AE logic unit 108 determines that an adjustment should be made, and computes an intermediate target, $Y_{local\_target}$, to be reached in one adjustment as a portion of the total difference between the current image luminance value and the target luminance value. The intermediate target, $Y_{local\_target}$, is computed so that a desired speed of AE reaction is achieved (e.g. $Y_{local\_target} = \frac{1}{2}(Y_{cur} + Y_{tg})$). The size of the intermediate target is selected to force the image brightness to approach the target value gradually as show in FIG. 2, so as to prevent oscillations around the target value.

Once the intermediate target, $Y_{local\_target}$, has been determined, AE logic unit 108 evaluates the number of steps needed to achieve the target using a predetermined stepping sequence stored in memory. The stepping sequence is a sequence of gain/exposure pairs arranged so as to produce equal relative image brightness changes between adjacent steps. As described above, each step of the sequence uses the largest suitable integration time and an appropriate gain.

The appropriate change in exposure time in the stepping sequence accounts for the fact that to avoid flickering of the image when illuminated by fluorescent light sources, any change in the integration time (exposure) can only be changed in increments (ITI) proportional to two times the period of intensity fluctuation of a fluorescent light source. Thus, for example, in a 60 Hz environment, the integration time is preferably changed in increments of approximately 8.33333 ms.

The smallest possible increment in gain is determined by the physical specifications of the apparatus. For each increment in integration time, several increments of gain can be executed to achieve a smooth increase in brightness. Thus, the steps which can be executed within one integration time increment in which only the gain is changed is defined as a zone.

Within the zone of the stepping sequence corresponding to one integration time, the steps constitute changes in the gain setting. Therefore, the minimum step in the stepping sequence is equal to the minimum gain change allowed by the system. All entries in the stepping sequence are designed to provide relative image brightness changes which are approximately equal to (or a multiple of) the minimum possible gain increment.

The stepping sequence includes of a number of zones, wherein each zone is defined by an index (Index) indicating the number of multiples of the integration time increment ITI. The exposure time within each zone is constant and is equal to ITI*Index, where ITI is the minimum integration time increment as described above. The minimum value of gain in each zone is equal to the minimum allowed/available gain for the system, $G_{min}$. On the other hand, the maximum gain $G_{max}$ in each zone is set so that:

$$ITI*(\text{Index})*G_{MAX}^{Index}*(1+MGS)=ITI*(\text{Index}+1)*G_{min}, \quad \text{(Eq. 3)}$$

wherein MGS is the minimum gain step allowed in the system.

Specifically, when the amount of increase or decrease in image brightness reaches a level which can be achieved by increasing or decreasing, respectively, the integration time by one ITI, the adjustment is achieved by the integration time rather by increasing or decreasing the gain to achieve the same adjustment. Between integration time intervals, the gain is used to increase or decrease the image brightness until the next change in integration time interval is applicable. Between $G_{min}$ and $G_{max}$ in each zone the gain increments change according to Eq. 4 as follows:

$$G_i*(1+MGS)=G_{i+1}, \quad \text{(Eq. 4)}$$

wherein i=1 ... K−1, and K=number of steps in the zone.

Since each zone of the stepping sequence has $G_{min}$ as the smallest gain setting and the size of gain steps is determined by Eq. 4, it is only necessary to store the maximum gain setting for every zone. A generalized table showing the integration time and the maximum gain setting for each zone is illustrated in FIG. 3A, while a similar table for a specific example of the stepping sequence of this system in which MGS=1/16 and ITI=8.33 is shown in FIG. 3B.

Each step in the stepping sequence changes the image brightness, Y, according to Eq. 5 as follows:

$$Y_i*(1+MGS)=Y_{i-1}, \quad \text{(Eq. 5)}$$

wherein i=1 ... K−1, and K=number of steps in the zone.

The size of AE step to be physically executed changes the image brightness from the current luminance value $Y_{cur}$ to an intermediate luminance value, $Y_{local\_target}$, and is proportional to the distance between the current image luminance value and target luminance value, as discussed above and as illustrated in FIG. 2. This is achieved by "skipping" the execution of zero or more steps in the stepping sequence, as appropriate, with the number of skipped steps, if any, being proportional to the magnitude of the deviation from the target brightness.

Specifically, given the measured image brightness, $Y_{cur}$, and the desired (intermediate) brightness, $Y_{local\_target}$, the AE logic unit 108 advances through the stepping sequence while simultaneously estimating the resulting image brightness by repeatedly applying Eq. 5 to the $Y_{cur}$ measurement. This is done iteratively in the AE logic unit 108, without physically executing the intermediate updates of the imager gain and exposure time. After N steps through the sequence the image brightness is expected to be $(1+MGS)^N*Y_{cur}$. Once this value is equal to $Y_{local\_target}$, AE logic unit 108 updates the imager gain and the exposure setting.

Prior to updating the gain settings, the individual color channel gains are modified to account for the gain ratios specified by the white balancing algorithm 114 in the apparatus.

Due to the discreteness of the gain and exposure settings, the exact value of the image brightness achieved at each step will be slightly different from the predicted result. However, the stability of the algorithm is assured by the fact that the AE logic unit 108 is not attempting to reach the final value, $Y_{tg}$, in a single adjustment, but rather by attempting to reach a series of intermediate values of $Y_{local\_target}$ until the luminance value is achieved to be between $Th_{max}$ and $Th_{min}$ as shown in FIG. 2.

Figure 4:
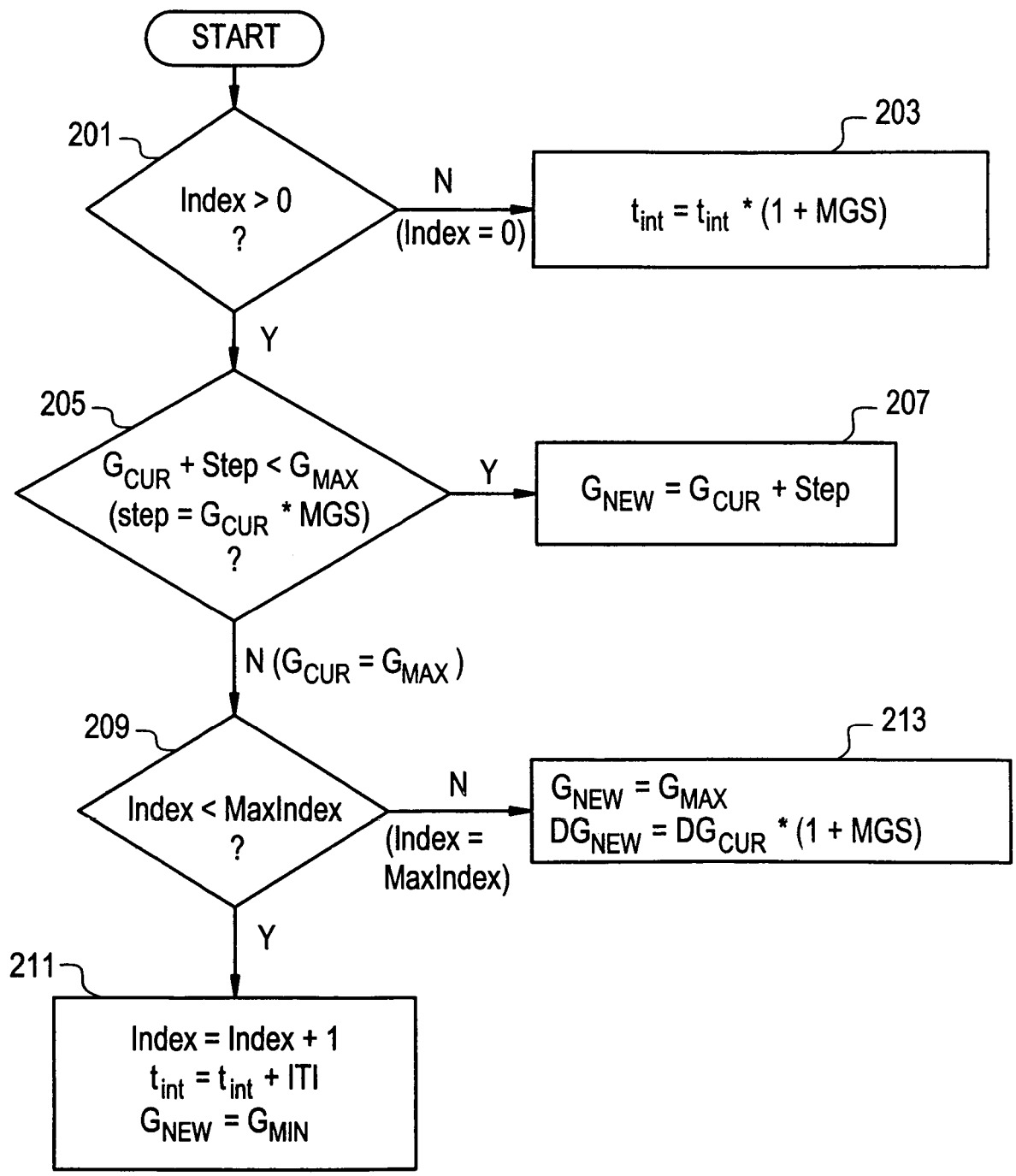
FIG. 4 is a flowchart demonstrating the logic implemented in the present invention for increasing the brightness of an image.

An example of the process logic performed in AE logic unit 108 for increasing the luminance value in an image is described with reference to FIG. 4. At process segment 201, AE logic unit 108 checks whether or not the current zone index is greater than 0. When the index is equal to 0, the integration time is less than a full increment, ITI. In this case, the current gain value $G_{cur}$ is at the minimum value $G_{min}$, and the brightness is increased only by increasing the integration time in increments proportional to the minimum gain according to Eq. 6 (process segment 203) until the integration time equals a whole number increment of the ITI, so as to maintain equal relative percentage changes in brightness between steps.

$$T_{int}=T_{int}*(1+MGS), \quad \text{(Eq. 6)}$$

wherein $T_{int}$ is the integration time.

On the other hand, when the index is greater than 0, the integration time is currently set at an integral multiple of the integration time interval, ITI. In this case, the AE logic unit 108 determines at process segment 205 whether the gain within the current zone is less than the maximum gain $G_{max}$ for that zone. If yes, then the brightness is increased by increasing the gain by the current increment value for that step according to Eq. 4, at process segment 207.

If the gain is found to be at the maximum gain at process segment 205, it is determined at segment 209 whether the index is currently at the maximum index allowable for the system. If not, the brightness is then increased by increasing the Index by 1, increasing the integration time to the new Index level by adding one increment of the ITI, and resetting the gain back down to the minimum level $G_{min}$, as indicated at segment 211. If the Index is already at the maximum value, the integration time is also currently at the maximum level and cannot be increased further. In this case, the brightness can only be increased by increasing a digital gain in the apparatus, if available. As shown at process segment 213, the gain value is set to $G_{max}$ at the highest Index, and the digital gain DG is increased according to Eq. 7, as follows:

$$DG_{new}=DG_{cur}*(1+MGS), \quad \text{(Eq. 7)}$$

wherein DG is the digital gain.

For very dark scenes, therefore, the brightness may be increased until the integration time interval reaches its maximum value, at which point the exposure time is at the system maximum, and the image brightness can only be increased further by increasing the gain, first by the analog increase until $G_{max}$ has been reached for the highest Index, and then by increasing the digital gain.

Figure 5:
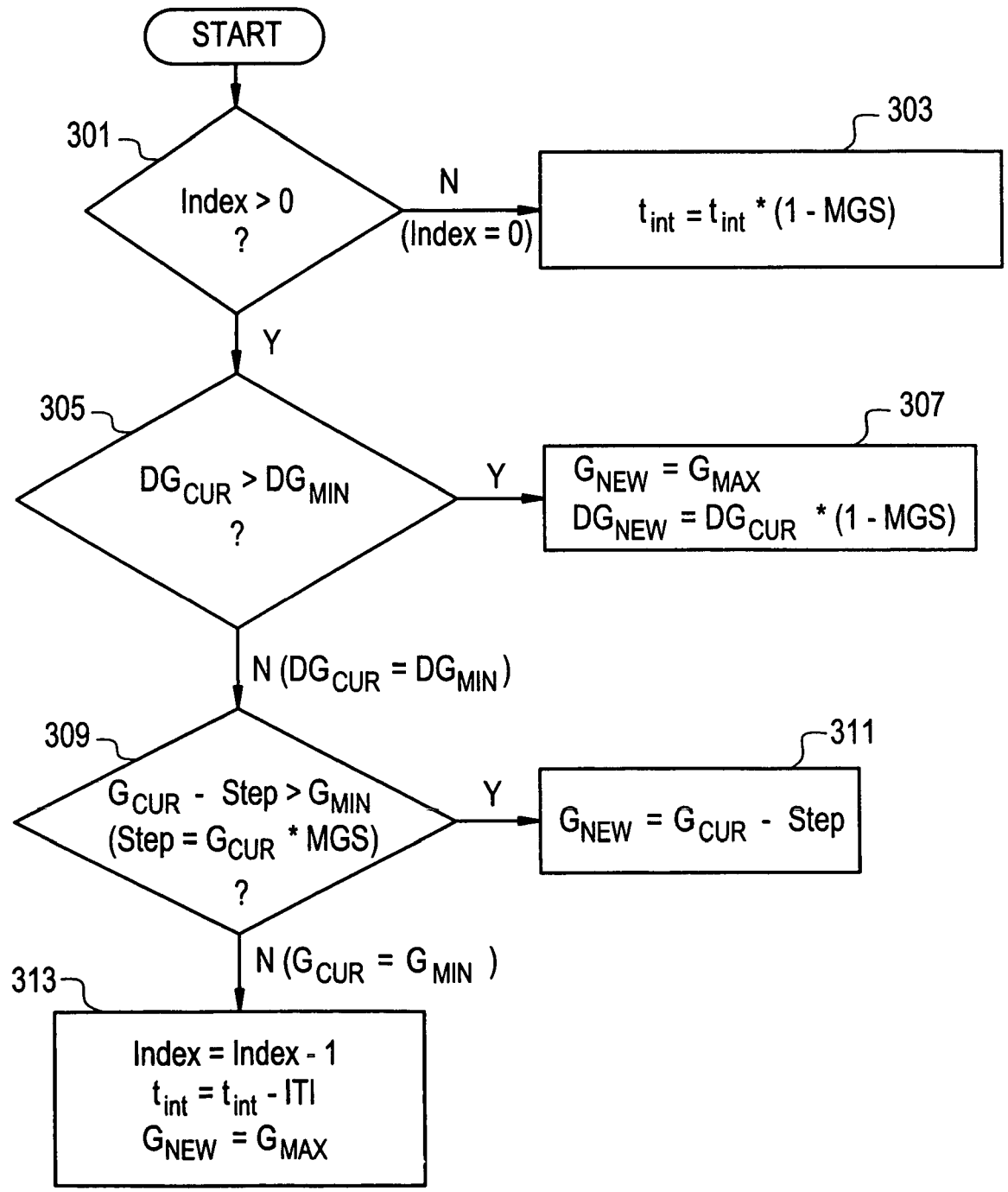
FIG. 5 is a flowchart demonstrating the logic implemented in the present invention for decreasing the brightness of an image.

An example of the process logic performed in AE logic unit 108 for decreasing the brightness in an image is described with reference to FIG. 5. At process segment 301, AE logic unit 108 checks whether or not the current zone index is greater than 0. When the index is equal to 0, the integration time is less than a full increment, ITI. In this case, the current gain value $G_{cur}$ is at the minimum value $G_{min}$, and the brightness is decreased only by decreasing the integration time in increments proportional to the minimum gain according to Eq. 8 (process segment 303) until the integration time equals a whole number increment of the ITI, so as to maintain equal relative percentage changes in brightness between steps.

$$T_{int} = T_{int} * (1 - MGS), \quad\quad (Eq. 8)$$

wherein $T_{int}$ is the integration time.

On the other hand, when the index is greater than 0, the integration time is currently set at an integral multiple of the integration time interval, ITI. In this case, the AE logic unit 108 determines at process segment 305 whether the gain is currently within the digital gain range. If yes, the digital gain is reduced at process segment 307 by an increment equal to the minimum gain, again, to maintain equal relative percentage changes between sequence steps.

If the digital gain is currently at the lowest digital gain setting $DG_{min}$, then it is determined at process segment 309 whether the gain is greater than the minimum gain $G_{min}$. If yes, then the gain is reduced at process segment 311 according to Eq. 9 as follows:

$$G_{new} = G_{cur} * (1 - MGS) \quad\quad (Eq. 9)$$

If, on the other hand the gain is currently at the minimum $G_{min}$, then the brightness is decreased by decreasing the integration time by one increment to the next lowest index number and resetting the gain to $G_{max}$ within the new integration time setting at process segment 313.

Thus, for very bright scenes, the brightness is reduced gradually according to the process described with reference to FIG. 5 until the gain is at the minimum within the integration time interval at Index=1, whereupon the brightness can only be further decreased by reducing the exposure time at Index=0 and at settings less than the integration time interval ITI.

Figure 6:
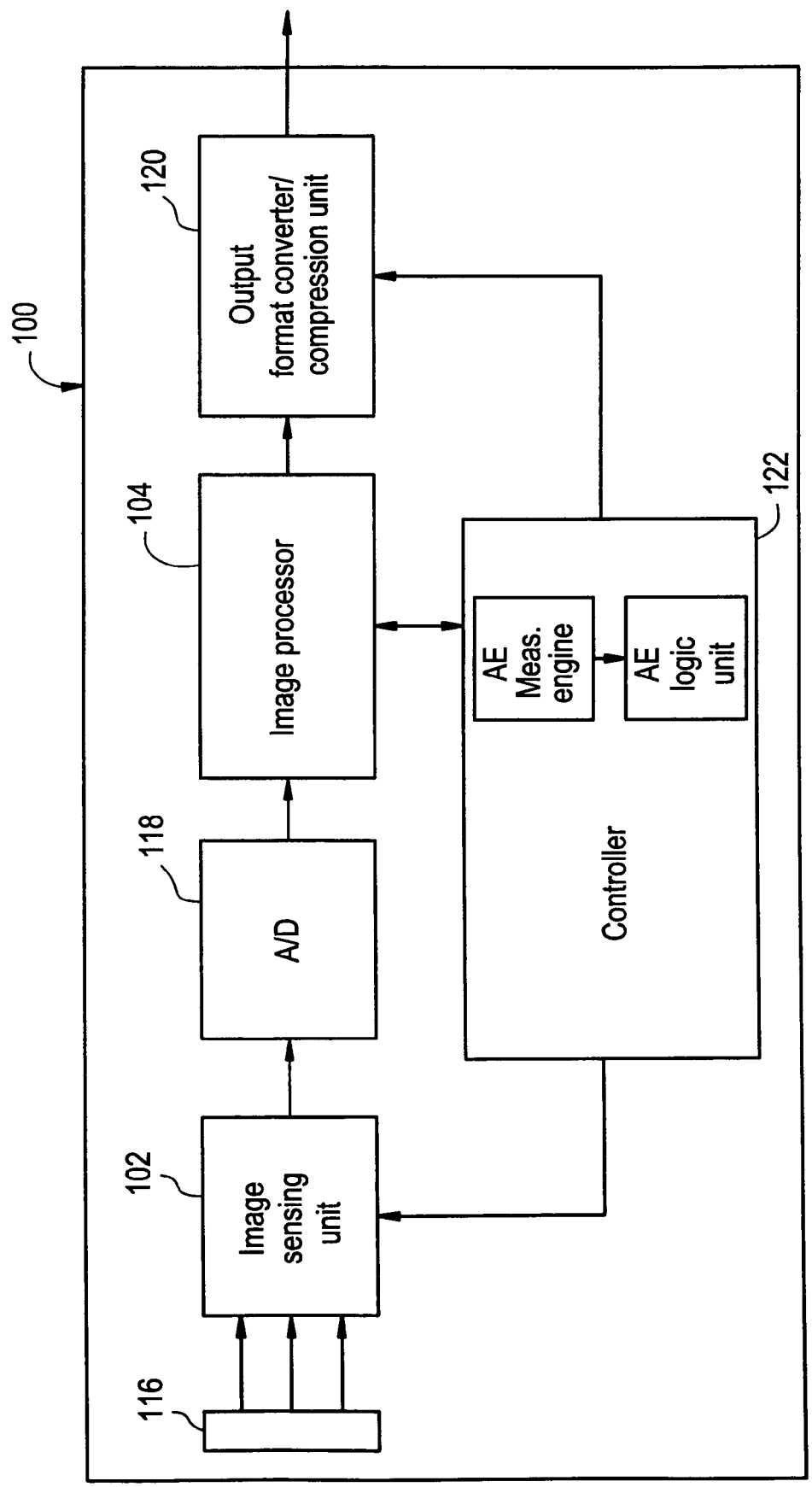
FIG. 6 illustrates an imaging apparatus incorporating the automatic exposure and gain control system and method of the present invention.

An example of an imaging apparatus 100 incorporating the features of the present invention discussed above is shown in FIG. 6, and includes a lens system 116 for directing light from an object to be imaged to the image sensing unit 102 including the image sensor; an analog-to-digital converter 118 for converting the image signals received at the image sensing unit 102 into digital signals; the image/color processing unit 104 for performing image correction processes such as data correction for defective pixels, color interpolation, sharpness filtering, white balancing, etc.; an output format conversion/compression unit 120 for converting the image data into an appropriate file format for being outputted or displayed to the user; and a controller 122 including the AE measurement engine 106 and the AE logic unit 108, the controller being provided for controlling the operations of the entire imaging apparatus 100.

Without being limiting, such an imaging apparatus 100 could include a computer system, camera system, scanner, machine vision system, vehicle navigation system, video telephone, surveillance system, auto focus system, star tracker system, motion detection system, image stabilization system and data compression system for high-definition television, all of which can utilize the present invention.

Figure 7:
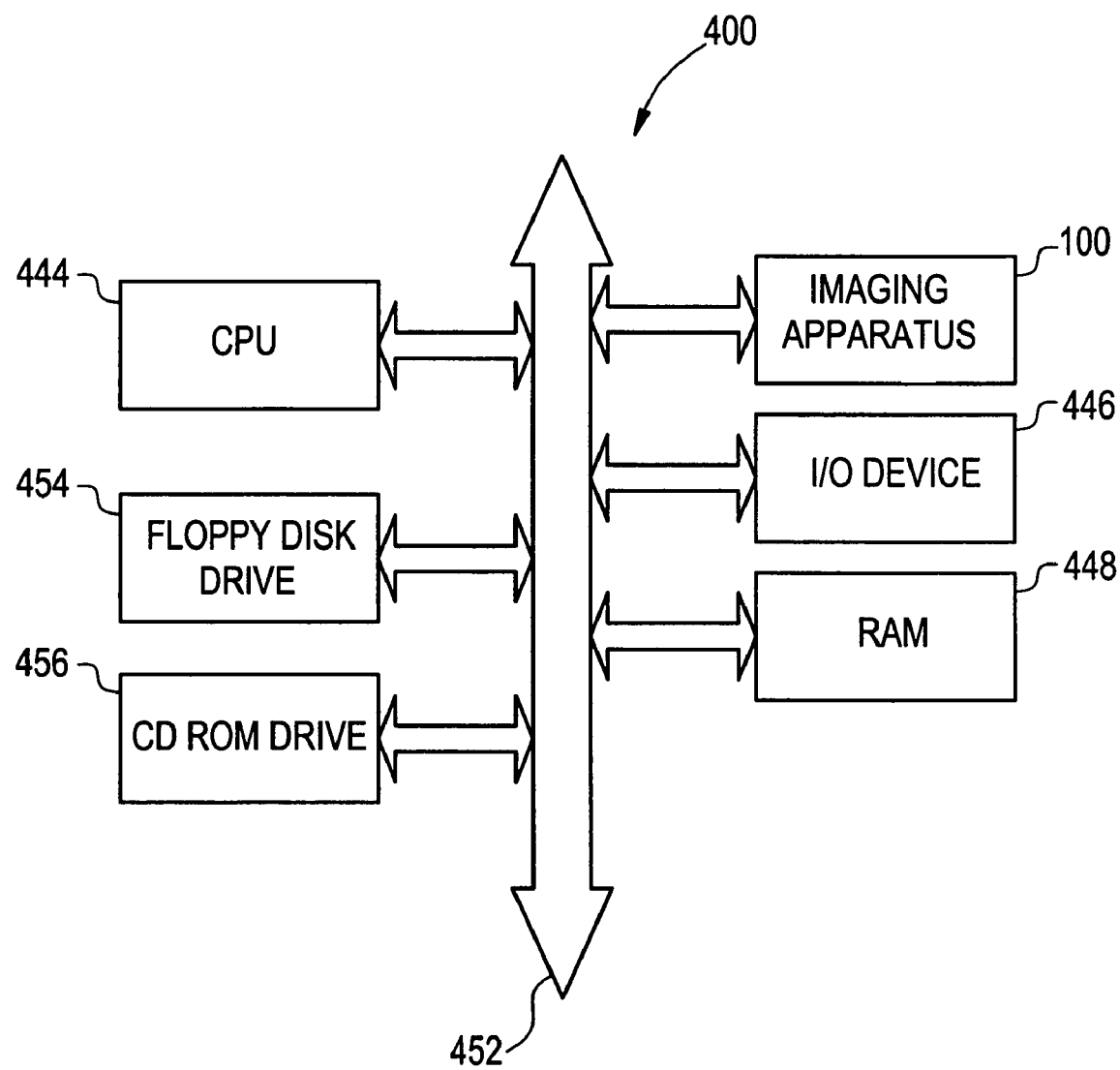
FIG. 7 is an illustration of a processing system communicating with an imaging apparatus of the present invention.

A processor system 400 as shown in FIG. 7, such as a computer system, for example, generally comprises a central processing unit (CPU) 444 that communicates with an input/output (I/O) device 446 over a bus 452. The imaging apparatus 100 communicates with the system over bus 452 or a ported connection. The processor system 400 also includes random access memory (RAM) 448, and, in the case of a computer system, may include peripheral devices such as a floppy disk drive 454 and a compact disk (CD) ROM drive 456 which also communicate with CPU 444 over the bus 452.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed as new and desired to be protected by Letters Patent of the United States is:

1. An imager comprising:
   an image sensing device with controllable gain and exposure control; and
   an image processing device for providing signals to control the gain and exposure for said image sensing device, said image processing device comprising:
      a measurement engine for measuring a current luminance value of an image based on data received from said image sensing device; and
      a logic unit for comparing the current luminance value obtained in the measurement engine with a target luminance value and determining whether or not it is necessary to adjust the brightness of an image, and for calculating a step size for adjusting the brightness if an adjustment is necessary, using a predefined stepping sequence, the logic unit applying the calculated step size to adjust a gain of the image signal and/or an integration time of the image and for calculating an intermediate target luminance value to which the image brightness is to be adjusted, the intermediate target luminance value being between the target luminance value and the current image luminance value,
      wherein the logic unit iteratively steps through the stepping sequence without physically adjusting the gain and/or integration time at each step and only adjusts the gain and/or integration time for the step at which the intermediate target luminance value is achieved.

2. The imager of claim 1, wherein the measuring engine measures the current luminance value as a spatial average of the luminance values over the entire image.

3. The imager of claim 1, wherein the measuring engine measures the current luminance value by dividing the image into a plurality of subframes and calculating a weighted sum of the luminance values of each of the subframes.

4. The imager of claim 1, wherein the measuring engine further measures a time averaged luminance value.

5. The imager of claim 1, wherein the logic unit adjusts the gain of the image signal.

6. The imager of claim 1, wherein the logic unit adjusts the integration time of the image.

7. The imager of claim 1, wherein the logic unit adjusts both the gain of the image signal and the integration time of the image.

8. An imager comprising:
   an image sensing device with controllable gain and exposure control; and
   an image processing device for providing signals to control the gain and exposure for said image sensing device, said image processing device comprising:
      a measurement engine for measuring a current luminance value of an image based on data received from said image sensing device; and
      a logic unit for comparing the current luminance value obtained in the measurement engine with a target luminance value and determining whether or not it is necessary to adjust the brightness of an image, and for calculating a step size for adjusting the brightness if an adjustment is necessary, using a predefined stepping sequence, the logic unit applying the calculated step size to adjust a gain of the image signal and/or an integration time of the image and for calculating an intermediate target luminance value to which the image brightness is to be adjusted, the intermediate target luminance value being between the target luminance value and the current image luminance value,
wherein the size of the step calculated by the logic unit is proportional to the difference between the current image luminance value and the target luminance value.

9. A method for operating an imaging apparatus, comprising:
obtaining an image from an image sensor;
measuring a current luminance value of the image;
comparing said current luminance value to a target luminance value to determine whether or not the brightness of the image should be adjusted;
if it is determined that the brightness of the image should be adjusted, determining an adjustment step size to be executed based on a predefined stepping sequence, wherein said adjustment changes the luminance value to an intermediate luminance value which is between said current luminance value and said target luminance value; and
changing a gain setting and/or an integration time of the image sensor in accordance with the determined step size by iteratively stepping through the stepping sequence without physically adjusting the gain and/or integration time at each step and only changing the gain and/or integration time for the step at which the intermediate luminance value is achieved.

10. The method according to claim 9, wherein the act of measuring the current luminance value comprises a spatial average of the luminance values over the entire image.

11. The method according to claim 9, wherein the act of measuring the current luminance value comprises dividing the image into a plurality of subframes and calculating a weighted sum of the luminance values of each of the subframes.

12. The method according to claim 9, further comprising determining a time averaged luminance value to prevent execution of brightness adjustments in response to short changes in scene illumination.

13. The method according to claim 12, wherein the determination of whether or not the brightness of the image should be adjusted is performed by comparing the time averaged luminance value to the target luminance value and evaluating whether the difference falls within a predetermined stability interval of the target luminance value.

14. A method for operating an imaging apparatus, comprising:
obtaining an image from an image sensor;
measuring a current luminance value of the image;
comparing said current luminance value to a target luminance value to determine whether or not the brightness of the image should be adjusted;
if it is determined that the brightness of the image should be adjusted, determining an adjustment step size to be executed based on a predefined stepping sequence, wherein said adjustment changes the luminance value to an intermediate luminance value which is between said current luminance value and said target luminance value; and
changing a gain setting and/or an integration time of the image sensor in accordance with the determined step size,
wherein each step in the predefined stepping sequence uses a largest suitable integration time and an appropriate gain to achieve an equal relative percentage change in brightness in the image between adjacent sequence steps.

15. The method according to claim 14, wherein the stepping sequence defines a plurality of zones in which the integration time setting is the same within each zone while a plurality of gain settings are defined within each zone.

16. The method according to claim 15, wherein each integration time setting is defined so as to avoid flickering in the image brightness due to illumination by an artificial light source.

17. The method according to claim 16, wherein each integration time setting is proportional to the period of intensity fluctuation of the illuminating light source, except in a range of brightness below the brightness levels achievable by the plurality of zones in which the integration time is shorter than the period of intensity fluctuation of the illuminating light source.

18. A method for operating an imaging apparatus, comprising:
obtaining an image from an image sensor;
measuring a current luminance value of the image;
comparing said current luminance value to a target luminance value to determine whether or not the brightness of the image should be adjusted;
if it is determined that the brightness of the image should be adjusted, determining an adjustment step size to be executed based on a predefined stepping sequence, wherein said adjustment changes the luminance value to an intermediate luminance value which is between said current luminance value and said target luminance value; and
changing a gain setting and/or an integration time of the image sensor in accordance with the determined step size,
wherein the calculated adjustment step size is proportional to the difference between the current image luminance value and a target luminance value.

* * * * *